United States Patent
Soupliotis et al.

(10) Patent No.: US 9,183,575 B2
(45) Date of Patent: Nov. 10, 2015

(54) PAY PER LOOK BILLING METHOD AND SYSTEM FOR OUT-OF-HOME ADVERTISEMENT

(75) Inventors: Andreas Soupliotis, Westmount (CA); Francois De Gaspe Beaubien, Montreal (CA); Giuseppe Cotugno, Cote-Saint-Luc (CA); Pierre-Yves Troel, Lachine (CA)

(73) Assignee: Ayuda Media Systems Inc., Montreal (CA)

( * ) Notice: Subject to any disclaimer, the term of this patent is extended or adjusted under 35 U.S.C. 154(b) by 33 days.

(21) Appl. No.: 14/001,473

(22) PCT Filed: Feb. 23, 2012

(86) PCT No.: PCT/IB2012/001013
§ 371 (c)(1),
(2), (4) Date: Nov. 12, 2013

(87) PCT Pub. No.: WO2012/114203
PCT Pub. Date: Aug. 30, 2012

(65) Prior Publication Data
US 2014/0067525 A1   Mar. 6, 2014

Related U.S. Application Data

(60) Provisional application No. 61/446,029, filed on Feb. 23, 2011.

(51) Int. Cl.
*G06Q 30/00* (2012.01)
*G06Q 30/02* (2012.01)

(52) U.S. Cl.
CPC ........ *G06Q 30/0273* (2013.01); *G06Q 30/0246* (2013.01); *G06Q 30/0269* (2013.01)

(58) Field of Classification Search
CPC .................................. G06Q 30/0273
USPC ....................................... 705/14.69
See application file for complete search history.

(56) References Cited

U.S. PATENT DOCUMENTS

| | | | |
|---|---|---|---|
| 2008/0147488 A1* | 6/2008 | Tunick et al. | 705/10 |
| 2009/0048908 A1 | 2/2009 | Kaplan et al. | |
| 2010/0106597 A1 | 4/2010 | Jayakody | |
| 2010/0313214 A1 | 12/2010 | Moriya et al. | |

FOREIGN PATENT DOCUMENTS

| | | |
|---|---|---|
| WO | 2007/015200 A2 | 2/2007 |
| WO | 2010/070882 A1 | 6/2010 |

OTHER PUBLICATIONS

International Search Report issued in PCT/IB2012/001013 mailed Oct. 31, 2012 (3 pages).
Written Opinion issued in PCT/IB2012/001013 mailed Oct. 31, 2012 (6 pages).
International Report on Patentability issued in PCT/IB2012/001013 dated Jul. 19, 2013 (22 pages).
Prior Art Admission by Inventor, dated Apr. 24, 2015 (2 pages).

* cited by examiner

*Primary Examiner* — John G Weiss
*Assistant Examiner* — Scott C Anderson
(74) *Attorney, Agent, or Firm* — Osha • Liang LLP

(57) ABSTRACT

Methods, apparatuses and systems for calculating an amount to be billed in respect of running an out-of-home advertisement during a period of time.

32 Claims, 10 Drawing Sheets

PAY PER LOOK BILLING METHOD AND SYSTEM FOR OUT-OF-HOME ADVERTISEMENT

FIELD OF THE INVENTION

The present invention relates to methods, apparatuses and systems in respect of out-of-home-advertising.

BACKGROUND OF THE INVENTION

Out-of-home advertising is a significant part of the advertising market that includes essentially all types of advertising that are directed to consumers while they are outside of their home. Out-of-home advertising thus covers all kinds of advertising other than broadcast, print or Internet media (notwithstanding the fact that people may view one of these types of media while actually outside of their home). Some (non-limiting) examples of out-of-home advertising include (i) billboards (e.g. paper billboards, digital billboards, etc.), (ii) street furniture (e.g. bus shelters, news-racks, mall kiosks, telephone booths, etc.), (iii) transit advertising (e.g. advertising on buses, trains, subways, trucks and taxis; advertising in stations, on platforms and in airports), and (iv) alternative advertising (including all non-transitional advertising such as advertising in bathrooms, in stadiums, on gas pumps, on bike racks, etc.).

With respect to cost, the owners of media used for out-of-home advertising conventionally do not typically charge a flat, fixed price for their media's use. The price of any particular specific medium will vary depending on a number of conventional factors including the population demographics of the market in which that specific medium is located, the actual specific location of that specific medium, the amount of traffic that the specific medium will receive during the course of the advertisement, and the demand for the use of the specific medium. To take an obvious example, the cost of time of a billboard in Times Square, New York City, N.Y., USA at Christmastime, will be much greater than the cost of time of a billboard along a highway in a rural desert area of New Mexico, USA at the same time of the year.

With respect to the amount of traffic that the specific medium will receive during the course of the advertisement, the traditional conventional measure of traffic is termed "daily effective circulation" or "DEC". The DEC for a particular advertising medium represents the number of adults (persons 18 years of age or older) passing and potentially exposed to the medium over the course of either 12 hours (from 6 am to 6 pm—where the medium is unilluminated) or 18 hours (from 6 am to 12 midnight—where the medium is illuminated). The DEC for a particular medium is calculated by statistical means after having measured the appropriate sample data on which the statics can be based. The DEC can be combined with demographic data of the population in which the advertising medium is based to get a theoretical possible picture of the demographics for the DEC for the medium. DEC has its limits in that it measures only adults potentially exposed to an advertisement and not those that actually looked at it.

A newer measurement (building upon DEC and attempting to overcome its drawbacks) is termed "eyes on impressions" or "EOI". EOI is an attempt to measure of the number of people who will actually see the advertisement on a particular medium and not just those who will be exposed to the advertisement and could potentially see it. For example, according to CBS Outdoor's website (CBS Outdoor being one of the major participants in the out-of-home advertising market), EOI builds on DEC by "adding context such as size, distance from the road, illumination, and other factors that affect a billboard's impact on a consumer" (speaking in respect of a roadside billboard). (See, https://www.cbsoutdoor.com/tools/resources/eyesonout-of-homemediameasurement.aspx for example, incorporated herein by reference). EOI (at least in theory) provides a more reasonably accurate measurement of the persons who will actually see an advertisement located on a particular medium, at least as far as current statistical models will allow. EOI also attempts to provide the demographics of such persons, which is a better estimate of the demographics of the population that actually looked at the advertisement than using the DEC as described above.

DEC and EOI are important in the advertising industry as out-of-home advertising media are typically priced in cost per thousand exposures or "CPM". In order to calculate the total cost of running an advertisement on a particular medium per day, one needs to know the DEC/EOI and the CPM; the total cost per day for the advertisement on the medium being the DEC or EOI times the CPM. (In order to facilitate this calculation DEC and EOI are typically expressed in thousands.)

DEC (along with demographic data) or EOI can also be important to advertisers in that they can allow advertisers (or their advertising agencies) to select individual advertising media based on the numbers of people in their particular target demographic(s) that will actually (to the extent that statistics will allow this to be determined), look at the advertisement on the medium.

While using DEC or EOI is a currently accepted method in the advertising marketplace, improvements are nonetheless possible.

SUMMARY OF THE INVENTION

It is thus an object of the present invention to provide an improvement over conventional methods of advertising costing using DEC or EOI.

The present inventors have realized that, notwithstanding the fact that the out-of-home advertising industry is functioning well with respect to the measurements described hereinabove, improvement is nonetheless possible. Specifically the present inventors have realized that at least some of the various uses that the industry participants make of the DEC and/or EOI, and particularly those related to billing might be improved if it were possible to measure the actual number of persons who actually looked at an advertisement on a particular medium during a particular period of time, and not just extrapolate this number using smaller measurements and statistical techniques. In order to do this, in a broad sense, in one aspect the present invention involves computer processing of digital images of persons in proximity to the particular advertisement during the relevant period of time to determine whether the eyes or face of the person (as the case may be) actually face the advertisement (and if so it will be assumed that the person looked at the advertisement). In this manner, if the direction the eyes or face (as the case may be) of each person who comes into proximity with the advertisement (or at least most people who come into proximity with the advertisement—no system is foolproof) is so analyzed, a much more accurate total of the persons who actually looked at the advertisement during the period of time can be gathered (as compared with conventional statistical methods). In this way, advertisers can be billed on the actual number of persons who looked at an advertisement as opposed to some estimated number. Embodiments of this system may have other potential advantages (depending on the embodiment), which are discussed below.

Thus, in a first aspect, there are embodiments of the invention that provide a method of calculating an amount to be billed in respect of running an out-of-home advertisement during a period of time, comprising: a) determining a total number of persons whose eyes (or face—as the case may be) faced the advertisement during the period of time by a sub-method including: i) obtaining via a digital camera an image of a sufficient amount of a person in proximity to the advertisement to determine whether the person's eyes (or face—as the case may be) are facing the advertisement; ii) processing the image by a computer processor to determine whether the person's eyes (or face—as the case may be) are facing the advertisement; iii) if the person's eyes (or face—as the case may be) are facing the advertisement, storing in a database data indicating that the person's eyes (or face—as the case may be) are facing the advertisement; and iv) repeating i) through iii) during the period of time; b) retrieving from the database data representative of the total number of persons whose eyes (or face—as the case may be) faced the advertisement during the period; and c) calculating via the computer processor a total amount to be billed in respect of the advertisement for the period of time as a function of the total number of persons whose eyes (or face—as the case may be) (for the sake of brevity the expression "(or face—as the case may be)" is not reproduced herein below, but should generally be understood to be present as is the case above) faced the advertisement during the period. Similarly, there are embodiments of the invention that provide a computer readable storage medium comprising instructions executable by a computer processor to cause the aforementioned method to be carried out. Similarly, there are embodiments of the invention that provide a system for calculating an amount to be billed in respect of running an out-of-home advertisement during a period of time, comprising: a) a digital image obtention component that obtains from a digital camera an image of a sufficient amount of a person in proximity to the advertisement to determine whether the person's eyes are facing the advertisement; b) a digital image processing component that processes the image to determine whether the person's eyes are facing the advertisement; and c) a database for storing a data indicating that the person's eyes faced the advertisement, if the person's eyes are facing the advertisement; d) a retrieval component that retrieves from the database data representative of the total number of persons whose eyes are facing the advertisement during the period; and e) a calculator component that calculates a total amount to be billed in respect of the advertisement for the period of time as a function of the total number of persons whose eyes faced the advertisement during the period.

In a second aspect, there are embodiments of the invention that provide a method of calculating an amount to be billed in respect of running an out-of-home advertisement during a period of time, comprising: a) retrieving from a database data representative of a total number of persons whose eyes faced the advertisement during the period, the data having resulting from computer processing by a first computer processor of images of persons in proximity to the advertisement during the period to determine whether the eyes of the persons were facing the advertisement; and b) calculating, via a second computer processor, a total amount to be billed in respect of the advertisement for the period of time as a function of the total number of persons whose eyes faced the advertisement during the period. In some embodiments, retrieving data includes retrieving data over a network. Similarly, there are embodiments of the invention that provide a computer readable storage medium comprising instructions executable by a computer processor to cause the aforementioned method to be carried out. Similarly, there are embodiments of the invention that provide a system for calculating an amount to be billed in respect of running an out-of-home advertisement during a period of time, comprising: a) a retrieval component that retrieves from a database data representative of a total number of persons whose eyes faced the advertisement during the period, the data having resulting from computer processing by a computer processor of images of persons in proximity to the advertisement during the period to determine whether the eyes of the persons were facing the advertisement; and b) a calculator component that calculates a total amount to be billed in respect of the advertisement for the period of time as a function of the total number of persons whose eyes faced the advertisement during the period.

This second aspect is focused more directly on the networkability of the present invention. Thus, while it is possible to have all of the hardware and software required for implementing the present invention in one location, it is not required. In many embodiments the various components are not in the same location and are networked together. In such instances, generally the software causing the operation of the camera and the software calculating the amount to be billed will be running on different machines in different locations. The rest of the software required may be either at one of those locations or in a different location altogether. This is possible as long as the various components can at some point communicate with one another.

Thus, in some embodiments of this second aspect, prior to retrieving the data, the method further comprises (i) receiving via a network data indicating that the eyes of a person in proximity to the advertisement during the period are facing the advertisement, the data having resulting from computer processing by a computer processor of an image of the person to determine whether the eyes of the person are facing the advertisement; (ii) storing data indicating that the person's eyes are facing the advertisement in the database; and iii) repeating i) through ii) during the period of time. Similarly, there are embodiments of the invention that provide a computer readable storage medium comprising instructions executable by a computer processor to cause the aforementioned method to be carried out. Similarly, there are embodiments of the invention that provide the aforementioned system of this second aspect, further comprising c) a receiving component that, prior to the retrieval component retrieving the data representative of a total number of persons whose eyes faced the advertisement during the period, receives via the network data indicating that the eyes of a person in proximity to the advertisement during the period are facing the advertisement, the data having resulting from computer processing by a computer processor of an image of the person to determine whether the eyes of the person are facing the advertisement; and d) the database, if the person's eyes are facing the advertisement, the database storing data indicating that the person's eyes are facing the advertisement in the database. Thus, in these particular embodiments the data is stored in a central database, however the processing of the images occurs remotely.

In some embodiments of this second aspect, prior to retrieving the data, the method further comprises i) receiving via a network the data representative of the total number of persons whose eyes faced the advertisement during the period, the data having resulting from computer processing by a computer processor of images of persons in proximity to the advertisement during the period to determine whether the eyes of the persons are facing the advertisement. Similarly, there are embodiments of the invention that provide a computer readable storage medium comprising instructions executable by a computer processor to cause the aforementioned method to be carried out. Similarly, there are embodiments of the invention that provide the aforementioned system of this second aspect, further comprising a receiving component that, prior to the retrieval component retrieving the data representative of a total number of persons whose eyes faced the advertisement during the period, receives via the network the data representative of the total number of persons whose eyes faced the advertisement during the period, the data having resulting from computer processing by a computer processor of images of persons in proximity to the advertisement during the period to determine whether the eyes of the persons are facing the advertisement. Thus, in these particular embodiments data is not stored in a central location.

In some embodiments of this second aspect, prior to retrieving the data, the method further comprises i) receiving from a digital camera, via the network, a digital image of a sufficient amount of a person in proximity to the advertisement to determine whether the person's eyes are facing the advertisement; ii) processing the image by a computer processor to determine whether eyes of the person are facing the advertisement; iii) if the person's eyes are facing the advertisement, storing in the database data indicating that the person's eyes are facing the advertisement; iv) repeating i) through iii) during the period of time. Similarly, there are embodiments of the invention that provide a computer readable storage medium comprising instructions executable by a computer processor to cause the aforementioned method to be carried out. Similarly, there are embodiments of the invention that provide c) a receiving component that, prior to the retrieval component retrieving the data representative of a total number of persons whose eyes faced the advertisement during the period, receives from a digital camera via the network an image of a sufficient amount of a person in proximity to the advertisement to determine whether the person's eyes are facing the advertisement; d) a digital image processing component that processes the image to determine whether eyes of the person are facing the advertisement; and e) a database for storing a data indicating that the person's eyes are facing the advertisement, if the person's eyes are facing the advertisement. Thus, in these particular embodiments images are processed and data stored centrally.

With respect to both aspects, using appropriate images obtained from a digital camera appropriately placed with respect to an advertisement in combination with software known as "anonymous facial recognition software" (or other software that servers a similar function), it is possible to get an accurate count of persons who actually looked at an advertisement over a period of time. (The period of time could be any period of time for which it is desired to have such measurements. There is no general reason why the period of time could not be the entire period of time that the advertisement is running. But, if desired the period of time could be some part (or parts) of the entire period of time that an advertisement is running. There are no limitations in this respect.) Anonymous facial recognition software works best in this instance as its purpose is not to identify a particular person from an image (in fact it does not do this). Its purpose is only to identify parts of a face of a person, in this case likely specifically the eyes of the person are most important, and where they are located (in this case specifically to help identify where they are looking). Either the eyes or the faces of persons may be used as the variable being processed depending on the software being used and how has been programmed to be used. Either will work in terms of the present invention, although, as is discussed below, using the entire face of the person, yields additional demographic information that will likely be of use (as is described in further detail below).

A running total of the number of people whose eyes/faces faced the advertisement can be kept. (Although one is not required to be kept. It is possible, although in many cases less efficient, to store in the database unique data each time that a person's image is processed and then simply at some future time create a total.) At least in association with the billing for advertisement, a total number of persons whose eyes/face faced the advertisement is retrieved and is used in the calculation of the amount to be billed. The amount to be billed is a function (in mathematical terms) of this number. It may be as simple as multiplying the total number of persons whose eyes/face faced the advertisement during the period of time by an amount per person to yield a total amount. Or it may be a more complex function. Some examples of more complex functions are given below. The invention is not limited by the particular function.

In the present context, "an amount per person" should not be understood as requiring that the actual multiplier is an amount person, it may effectively be an amount per person while actually being something else. As an example, an amount per thousand people (as is typically the industry standard), would qualify as an "amount per person" in the present context. In this respect, an amount from which the actual amount per person could be directly or indirectly calculated would qualify as an "amount per person".

Embodiments of the present invention will function with any type of out-of-home advertising for which it is technologically possible to take the requisite appropriate image. (Although merely because it is technologically possible for the invention to be used, does not mean that in every a situation its use will be useful, desirable or even legal.) As a simple example is a single digital media panel located in the domestic baggage claim of an airport having a digital camera mounted directly above the advertisement and aimed so as to be able to take images of people in front of the advertisement.

The digital image can have been taken by any type of device that can take images (e.g. camera, video camera, etc.). The image can be in any format, as long as the image is either, (1) processable by the software doing the processing to achieve the result that must be achieved (i.e. to determine whether or not the eyes or the face (as the case may be) of the person are facing the advertisement), or (2) convertible into a format that is so processable. An example is the Logitech Quickcam Pro 9000.

As was discussed above, the processing of the image will typically occurs using what is known as anonymous face detection software. The purpose of such processing is not identify the actual person (in the sense of determining who the person is), but rather simply to determine whether or not the persons eyes or face (as the case may be) are facing at the advertisement so that an assumption may be as to whether the person is actually looking at the advertisement. Some manufacturers of such anonymous facial detection software are CognoVision Solutions Inc. of Canada; Intel Corporation of the USA (Intel AIM Suite); and TruMedia Technologies of Israel. Specific software manufactured by a specific manufacturer is not required. Any software will suffice as long as it is able to carry out the requisite function.

The database may be any kind of database that is structured so as to store the requisite data that must be stored and from which the requisite data to be retrieved is retrievable. Thus most conventional commercial database server software will be adequate. Examples include Oracle, DB2, Informix, DQL Server, etc.

Any kind of computer hardware may be used as long as it is compatible with the software to be used and is capable of carrying out the functions that must be carried out. For example, conventional PC compatible computers (with Intel processors and a Microsoft Windows operating system) may be used. Where the anonymous facial recognition software is Intel's AIM suite, it is recommended for the computer to have an Intel Core 2 Duo 2.0 GHz processor or faster, with 1-2 Gb minimum of RAM, and running MS Windows XP or newer.

In some method embodiments, prior to obtaining the image via the digital camera, the method further comprises positioning the digital camera with respect to the advertisement so as to be able to obtain the image. In similar system embodiments, the system includes a digital camera so positioned. In some of such embodiments the camera is positioned so as to be facing in the same general direction as the advertisement. (As this is likely to be the simplest positioning, depending on the circumstances, of the camera in order to facilitate taking the image that must be taken.) In the present context "positioning" (or "positioned") may be understood as including actually installing (either permanently or temporarily) a camera in a particular location or reorienting a camera that has been previously installed.

In some method embodiments, the method further comprises processing the image by the computer processor to determine an age group of the person. In similar system embodiments, the digital image processing component so processes the image. In the present context "age group" should be understood as generally a category of person in which the person may be classified according to their age as perceived by the software processing the image. Thus, depending on the capabilities of the software doing the actual processing, and the parameters/settings having been selected, the possible "age groups" will vary. Examples are "youth" (i.e. less than 18 years of age), "adult" (between 18 and 65 years of age), and "senior" (i.e. more than 65 years of age). One of the possibilities of such embodiments is that they allow for (although do not require) differential billing based on age groups. Thus, in some embodiments calculating the total amount to be billed in respect of the advertisement for the period of time includes, at least for each age group for which a total number of persons of that age group whose eyes/faces faced the advertisement during the period of time is greater than zero, multiplying the total number of persons of that age group whose eyes/faces faced the advertisement during the period of time by an amount per person in respect of that age group, resulting in an amount for that age group; and summing the resulting amounts for each age group together. In some such embodiments, the amount per person in respect of at least two age groups differs; it being possible for them all to differ. In some such embodiments, the amount per person in respect of at least one age group is effectively zero. The calculator component may be so configured to carry this out.

In some embodiments, the method comprises processing the image by the computer processor to determine a sex of the person (i.e. whether the person is male or female). In similar system embodiments, the digital image processing component so processes the image. One of the possibilities of such environments is that they allow for (although do not require) differential billing based on sex. Thus, in some embodiments, calculating the total amount to be billed in respect of the advertisement for the period of time includes, at least for each sex for which the total number of persons of that sex whose eyes/faces faced the advertisement during the period of time is greater than zero, multiplying the total number of persons of that sex whose eyes/faces faced the advertisement during the period of time by an amount per person in respect of that sex, resulting in an amount for that sex; and summing the resulting amounts for each sex together. In some such embodiments, the amount per person in respect of each sex differs. In some such embodiments, the amount per person in respect of one sex is effectively zero. The calculator component may be so configured to carry this out.

In some embodiments, the method further comprises storing in the database data indicating a time of day that the image was obtained. Another of the possibilities of some embodiments is that they allow for (although do not require) differential billing based on time of the day. Thus, in some embodiments, calculating the total amount to be billed in respect of the advertisement for the period of time includes, at least for a plurality of groups of times of the day for which a total number of persons whose eyes/faces faced the advertisement during each one of the plurality of groups of times of the day is greater than zero, multiplying the total number of persons whose eyes/faces faced the advertisement during a particular one of the groups of times of the day, by an amount per person in respect of that particular one of the groups of times of the day, resulting in an amount for each one of the plurality of groups of times of the day; and summing the resulting amounts for each one of the plurality of groups of times of the day together. In some such embodiments, the amount per person in respect of at least two of the groups of times of the day differs; it being possible for them all to differ. In some such embodiments, the amount per person in respect of at least one of the groups of times of the day is effectively zero. In the present context no particular number of groups of times of the day is required. There could be any number. For example, each hour of the day could form a group of times of the day. The calculator component may be so configured to carry this out.

In some embodiments, the method further comprises storing in the database data indicating a date that the image was obtained. Another of the possibilities of some embodiments are that they allow for (although do not require) differential billing based on date. Thus, in some embodiments, calculating a total amount to be billed in respect of the advertisement for the period of time includes, for at least a plurality of groups of dates for which a total number of persons whose eyes/faces faced the advertisement during each one of the plurality of the groups of dates is greater than zero, multiplying the total number of persons whose eyes/faces faced the advertisement during a particular one of the groups of dates, by an amount per person in respect of that particular one of the groups of dates, resulting in an amount for each one of the plurality of the groups of dates; and summing the resulting amounts for each one of the plurality of the groups of dates together. In some such embodiments, the amount per person in respect of at least one of the groups of dates is effectively zero. In the present context no particular number of groups of dates is required. There could be any number. For example, each day could form a group of dates (i.e. it possible to have a group or groups of a single date). The calculator component may be so configured to carry this out.

In some embodiments, the method further comprises storing in the database data indicating a location where the image was obtained. In some embodiments, the location data is hard coded in to the software. In other embodiments, the data indicating the location where the image is obtained via a positioning system (e.g. GPS, A-GPS, mobile device (e.g. phone) positioning using mobile networks, etc.) This may be useful where the advertisement is mobile. Another of the possibilities of some embodiments that they allow for (although do not require) differential billing based on the location of the advertisement. Thus some embodiments, calculating a total amount to be billed in respect of the advertisement for the period of time includes, for a plurality of locations for which a total number of persons whose eyes/faces faced the advertisement at each one of the plurality of locations is greater than zero, multiplying the total number of persons whose eyes/faces faced the advertisement at a particular location of the plurality of locations, by an amount per person in respect of that particular location, resulting in an amount for each one of the plurality of locations; and summing the amounts for each of the plurality of locations together. In some such embodiments, the amount per person in respect of at least two locations differs. In some such embodiments, the amount per person in respect of at least one location is effectively zero. In the present context no particular number of locations is required. There could be any number. For example, each location could its own specific amount (some of which might be the same and others of which might differ). The calculator component may be so configured to carry this out.

In some embodiments, the method further comprises further comprising storing in the database data indicating a duration of time that the person's eyes/face are facing the advertisement. As the method can be repeated over and over again (limited only by the rate of the slowest step in the method (likely the image obtention step)), it is possible to track how long the eyes or face (as the case may be) of any particular person face the advertisement. It may be useful for advertisers to know how long their advertisements hold people's attention. It may also be useful for billing as another of the possibilities of some embodiments that they allow for (although do not require) differential billing based on the duration that person's eyes/face faced the advertisement. Thus some embodiments, wherein calculating a total amount to be billed in respect of the advertisement for the period of time includes, for at least a plurality of groups of durations of time that a person's eyes/face faced the advertisement for which a total number of persons whose eyes/faces faced the advertisement during each one of the plurality of the groups of durations of time is greater than zero, multiplying the total number of persons whose eyes/faces faced the advertisement during a particular one of the groups of durations of time, by an amount per person in respect of that particular one of the groups of durations of time, resulting in an amount for each one of the plurality of groups of durations of time; and summing the resulting amounts for each one of the plurality of the groups of durations of time together. In some such embodiments, the amount per person in respect of at least two groups of durations differs. In some such embodiments the amount per person in respect of at least one group of durations is effectively zero. The calculator component may be so configured to carry this out.

It should be understood that with respect to the aforementioned differential billing possibilities, there is no limitation to implementing differential billing on different characteristics simultaneously. Thus differential billing might be simultaneously implemented based on more than one of, or even all of: age group, sex, time of day, date, location, duration of time looking at the advertisement, etc.

In some embodiments, the method further comprises, if the person's eyes/face are not facing the advertisement, storing in the database data indicating that the person's eyes/face are not facing the advertisement. It may be useful for advertisers to know this information in some instances.

In some embodiments, the advertisement is presented via a digital medium (such as a digital display panel). In other embodiments, the advertisement is presented on a non-digital medium (such as a billboard). In either case, the medium may be static (i.e. the advertisement being presented does not change over a relatively short period of time—which is usually, although not always, the case with a non-digital medium); or the medium may be variable (i.e. the advertisement being presented changes over a relatively short period of time—which is usually, although not always, the case with a digital medium). In some embodiments, the advertisement is one of a plurality of advertisements being presented via the digital medium during the period of time. With digital media a common situation is for a medium to display a loop of advertisements over a relatively short period of time. While there is no fixed requirement in this respect, an example might be a 2 minute loop having 8 different advertisements of 15 seconds each. After each advertisement is played, the next beings. After the eighth advertisement plays, the first one begins again. It is also common that the different advertisements forming part of the loop may change over time, so for instance, after the first hour, a different advertisement could take the place of the third advertisement, etc. It is also possible that the number of advertisements in the loop could change over time. It is also possible that the length of some (or all) of the advertisement change over time. It is also possible that the length of the loop could change over time. Other possibilities not detailed here are of course also possible.

Given this, in some embodiments, the method further comprises, based on demographics of the persons whose eyes/faces faced the advertisement during at least a portion of the period of time, sending computer-executable instructions over a computer network to cause a change in at least one of times of the day, dates, and frequency of presentation of the advertisement during the period of time. The flexible nature of digital display media combined with the ability to get real time demographics (and actual historical demographics) of persons actually looking at the advertisement means that the display of the advertisement can be optimized so as to be available to be viewed by the most number of people of a target demographic(s).

Further, in some embodiments, the period of time is divided into a plurality of sub-periods of time; and the method further comprises at least periodically recalculating a total amount to be billed in respect of the advertisement for one of the sub-periods of time, and when the total amount to be billed in respect of the advertisement for that one of the sub-periods of time reaches a budgeted amount for that one of the sub-periods of time, sending computer-executable instructions over a network to cause a reduction of a frequency of presentation of the advertisement for a remainder of that one of the sub-periods of time. Similarly, in some embodiments, the period of time is divided into a plurality of sub-periods of time; and the method further comprises at least periodically recalculating a total amount to be billed in respect of the advertisement for one of the sub-periods of time, and when the total amount to be billed in respect of the advertisement for that one of the sub-periods of time reaches a budgeted amount for that one of the sub-periods of time, sending computer-executable instructions over a network to cause the presentation of the advertisement for a remainder of that one of the sub-periods of time to be stopped. In some such embodiments the method further comprises sending computer-executable instructions over a network to cause the presentation of the advertisement to be restarted in a subsequent one of the sub-periods of time. In some such embodiments, the sub-periods of times are days. These aspects allow for a "budgeting" feature with respect to advertisements. In this respect, when the budget for a particular sub-period is reached, the display of the advertisement can be minimized or stopped. This allows an advertiser to, for example, ensure that their advertisement is presented over the entire period of their advertising campaign and not just during a portion thereof.

In some embodiments the method further comprises at least periodically recalculating the total amount to be billed in respect of the advertisement to date, and when the total amount to be billed in respect of the advertisement to date reaches a budgeted amount for that advertisement, sending computer-executable instructions over a network to cause the presentation of the advertisement to be stopped. These aspects also allow for a "real-time" or periodic (i.e. somewhat less often than real time) monitoring of the total cost to date (i.e. from the beginning of the presentation of the advertisement to the time of the calculation) so that the advertiser (and owner of the medium) can ensure that the costs of presenting the advertisement to no go (materially) over a budgeted amount. Thus when the budgeted amount is reached (i.e. attained or exceeded), presentation of the advertising stops.

In some embodiments, the digital medium is one of a plurality of associated digital media; further comprising, based on demographics of the persons of who eyes/faces faced the advertisement during at least a portion of the period of time, sending computer-executable instructions over a network to cause a change in ones of the associated digital media on which the advertisement is presented during the period of time. Further, in some embodiments, the digital medium is one of a plurality of associated digital media; further comprising, based on demographics of the persons of whose eyes/faces faced the advertisement during at least a portion of the period of time, sending computer-executable instructions over a network to cause a change in at least one of times of the day, dates, and frequency of presentation of the advertisement on at least two of the associated digital media. Where the digital medium is one of a number of associated digital media (for example, the digital medium is one of a number of advertising digital display panels in mall), the present aspects allow for changing the one (or ones) of the associated digital media on which the advertisement is displayed (in real-time if so desired) in order to correspond with the demographics of the persons looking at the displays. Thus, for instance, if an advertisement is targeted towards females between the ages of 18 to 65, the advertisement will be preferentially (or only) presented on those panels then (or historically) having persons looking at the advertisements thereon of a threshold amount of those demographics. The advertisement can also be reduced or stopped on those panels not having persons looking at them of a threshold amount of those demographics.

Embodiments of the present invention each have at least one of the above-mentioned objects and/or aspects, but do not necessarily have all of them. It should be understood that some aspects of the present invention that have resulted from attempting to attain the above-mentioned objects may not satisfy these objects and/or may satisfy other objects not specifically recited herein.

Additional and/or alternative features, aspects, and advantages of embodiments of the present invention will become apparent from the following description, the accompanying drawings, and the appended claims.

BRIEF DESCRIPTION OF THE DRAWINGS

For a better understanding of the present invention, as well as other aspects and further features thereof, reference is made to the following description which is to be used in conjunction with the accompanying drawings, where.

DETAILED DESCRIPTION OF THE PREFERRED EMBODIMENTS

Figure 1:
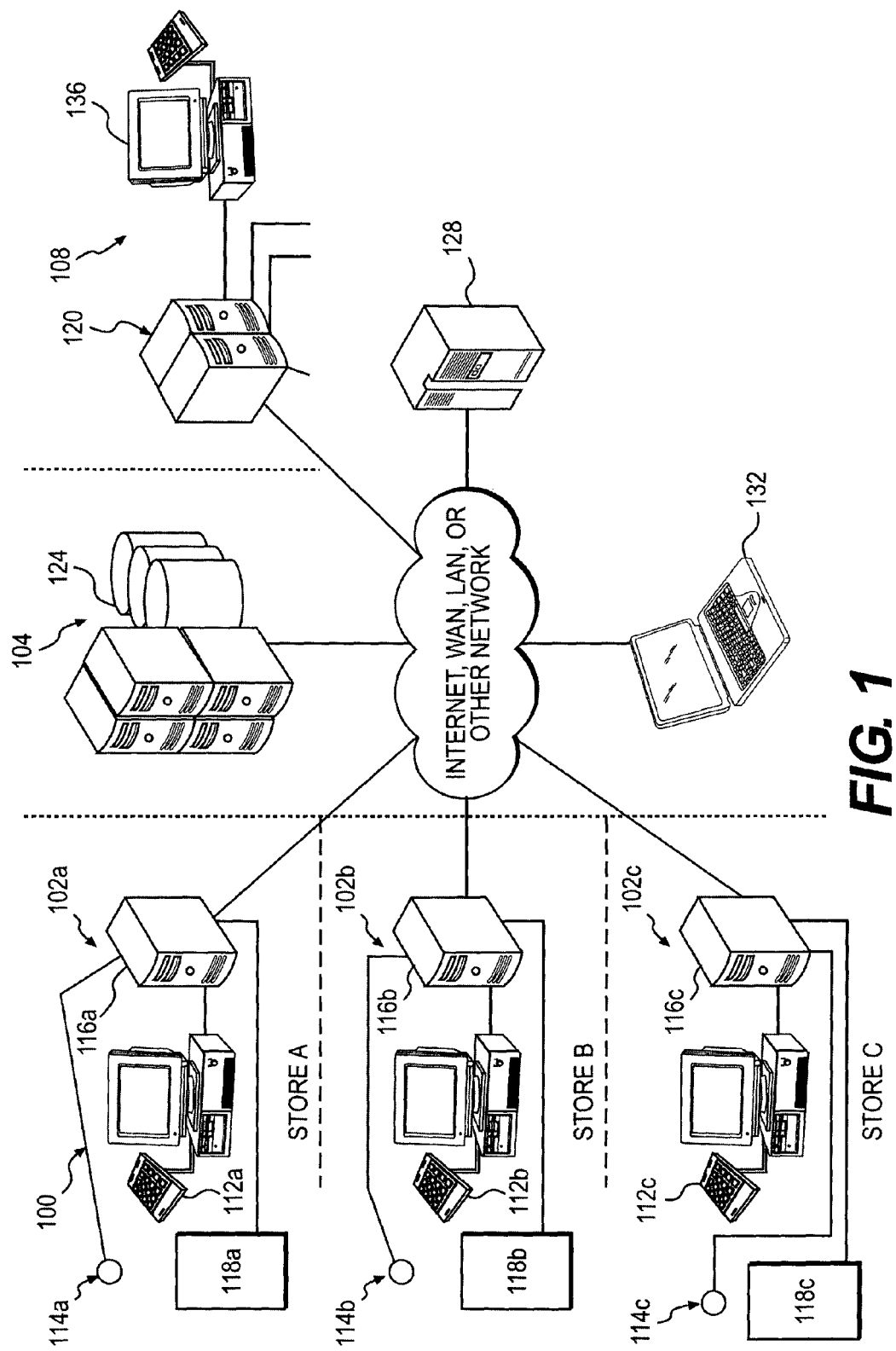
FIG. 1 is a schematic representation of an embodiment of the present invention.

Referring to FIG. 1 there is shown a computer system 100 being an embodiment of the present invention. Computer system 100 comprises 3 video subsystems 102a, 102b, 102c (hereinafter collectively 102), a database server 104, a billing/control subsystem 108, a laptop 132, and server 128. Each the components of computer system 100 are connected to each other via a network 110 (shown as cloud, which may be any kind of suitable communication network).

Each of the video subsystems 102 is located a different location in a shopping mall. Video subsystem 102a is located near store A. Video subsystem 102b is located near store B. Video subsystem 102c is located near store C. Each of the video subsystems 102 consists of a standard PC compatible computer 116a, 116b, and 116c (hereinafter collectively 116) running Microsoft Windows and a video monitor and keyboard 112a, 112b, 112c (hereinafter collectively 112). The video monitor and keyboards 112 are each connected to the respective computers 116 via any conventional means (USB, Bluetooth, etc.) to allow for the transfer of data therebetween. For example, data can be input into the keyboard and transferred to the computer to provide instructions to be executed or carried out by a processor, with the instructions being stored in a memory of the computer for example. Other types of input devices can be connected to the computers 116 such as a mouse, trackball, touchscreen, etc. Video data is transferred from the video monitor to the computer 116 and stored in a database. The computers 116 are preferably located in a secure location. Mounted in an appropriate location is a display medium 118 used for displaying advertisements. It is recognized that other types of visual data and visual information can be displayed on the display medium 118. The display media 118 may consist of any appropriate hardware, ranging from a simple video monitor to more complex assemblies of view screens. The display media 118 are connected to one of the computers 116 via an appropriate video connection (e.g. DVI) for transmitted video data therebetween. The display media 118 can have additional output devices attached to it for outputting further information including speakers for broadcasting or playing music, noises or other audible sounds. It is recognized that the display media can communicate data with the computers 116 via a wireless network. Also mounted in proximity to the display media 118 are digital cameras 114a, 114b, 114c (hereinafter collectively 114). Digital cameras 114 are positioned such that they can take an image of the faces of persons in front of display media 118. Digital cameras 114 are connected to computers 116 via appropriate connections (e.g. USB) so as to transmit data (e.g. video data) to computers 116 to be stored on the database. It is recognized that the digital cameras 114 can communicate data with the computers 116 via a wireless network.

Each computer 116 includes a processor, which controls general operation of the computer. The processor also interacts with additional device subsystems such as a display, a flash memory, a random access memory (RAM), auxiliary input/output (I/O) subsystems, a serial port, a keyboard, a speaker, a microphone, a short-range communications subsystem such as Bluetooth™ for example, and any other device subsystems or peripheral devices. The memory stores instructions that are executed by the processor. Computer 116 can be two-way communication devices having data communication capabilities, including the capability to communicate with other computers 116, computer systems 100 or video subsystems 102.

Operating system software used by the processor may be stored in a persistent store such as the flash memory, which may alternatively be a read-only memory (ROM) or similar storage element (not shown). Those skilled in the art will appreciate that the operating system, specific computer 116 applications, or parts thereof, may be temporarily loaded into a volatile store such as RAM.

The processor, in addition to its operating system functions, enables execution of software applications on the computers 116. A predetermined set of applications, which control basic device operations, is installed on the computers 116, for example during its manufacture. These basic operations typically include data communication applications, for example. Additionally, applications may also be loaded onto computers 116 through the network 110, an auxiliary I/O subsystem, serial port 230, short-range communications subsystem, or any other suitable subsystem, and installed in RAM, or the persistent store, for execution by the processor. Such flexibility in application installation increases the functionality of the computers 116 and may provide enhanced on-device features, communication-related features, or both.

Database server 104 is a standard PC compatible server running Microsoft Windows Server and also running appropriate database server software (e.g. Microsoft SQL Server). Database server 104 has a storage device containing a database 124 to be used by the computer system 100. Database server is located in a different location than the shopping mall (although they could be in the same location). Data can be transferred from computers 116 across the network 110 to be stored or retrieved from the database 104. The database server 104 also has a processor and memory which can operate to manipulate the data stored in the database 124. For example, the data stored in the database 124 can be arranged by the processor according to a set of rules stored in memory. Further, the processor in the database server 104 can receive instructions across the network 110 for extracting data from or storing data in the database 124 or for manipulating the data in the database 124.

Billing/control subsystem 108 consists of a standard PC compatible computer 120 running Microsoft Windows and a video monitor and keyboard 136. It is recognized that other types of input or output devices can be connected to the computer 120 in the billing control system 108. Computer 120 can include the components described above in relation to the computers identified by numeral 116. Billing/control subsystem 108 is located in a different location than the shopping mall and the location of the database server 104 (although they could be in the same location). The computer 120 can transmit data to and receive data from the database server 104 and the video subsystems 102 across the network 110.

Figure 2:
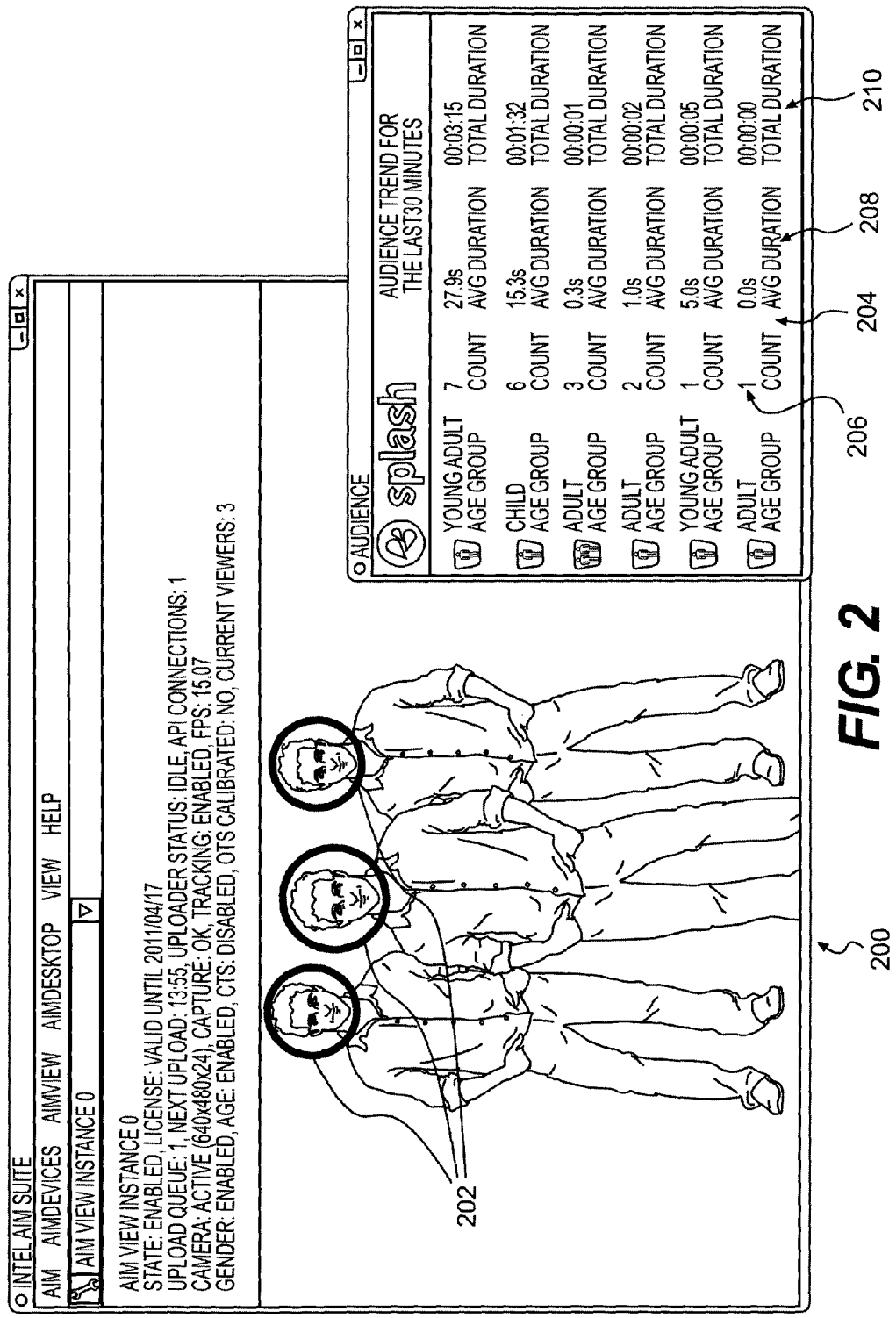
FIG. 2 is a sample output of anonymous facial recognition software running as part of a computer system of the present invention.

Running on each of the video subsystems 102 is Intel AIM suite anonymous facial recognition software ("AFR software"). For example, the AFR software can be running on computers 116. By way of further example, the AFR software can be retrieved or downloaded from a remote source across the network 110. FIG. 2 shows an image 200 captured by one of the cameras 118 and being processed by the AFR software. As shown in the image 200 each of the faces of the persons (including the one of the real life size cardboard cut-out of a person) in the image have been circled 202 and are being processed by the AFR software to determine the location of the faces, and the demographic information that can be garnered from the faces (as described above). In this particular case (as can been seen in the window in FIG. 2), the AFR software is able to determine the age group and sex of the persons as well as the duration that they are looking towards the advertisement. That information is sent to the database 124 as is described below, and as can been seen in FIG. 2 some statistics 204 then to date are displayed, i.e. the total number of persons 206 who have looked at the advertisement per age group per sex, the average duration 208 (broken down by age group by sex) that those persons looked at the advertisement, and the total duration 210 (again broken down by age group by sex) that those persons looked at the advertisement. In the embodiment shown in FIG. 2, the statistics are broken down by age group and by sex in the following way: young adult (female), child, adult couple, male adult, young adult (male), female adult.

Also running on each of the video systems 102 is a Microsoft Silverlight web application known as "Splash Player" written by Ayuda Systems of Montreal, Canada. One of Splash Player's functions is to interface with the database to control the display media 118. (It should be noted that Splash Player is not required, any software be it commercially available or custom written that accomplishes its functions will suffice.) Specifically information regarding what advertisement videos should be playing on the display media 118 when it is downloaded from the database 124. If the advertisement videos (in any appropriate video format) are not actually stored in the database 124 or on the computers 116, Splash Player will download them from server 128 (or otherwise remotely) to the computer 116 from across the network 110. Server 128 is a standard PC compatible server running Microsoft Windows Server, for example. By way of further example, server 128 can be a Web server, an application server or an application server with web services. Splash Player will then play the advertisement videos at the appropriate time and will send appropriate data to the database server 104 reflecting this fact so that it may be stored in the database 124. Splash Player will also interface with the AFR software running on the computer 116 and will send the appropriate data regarding the persons who looked at the advertisement to the database. Splash Player is also capable of retrieving the data regarding persons who looked at the advertisement from the database 124 and displaying it locally on the local video monitor 112 of the computer 116. (See FIG. 2).

Running on the billing/control subsystem 108 is a Microsoft Silverlight web application known as "Splash" written by Ayuda Systems of Montreal, Canada. Splash is used to control the system by allowing for the input of which video advertisements are to be played where and when (and storing them in the database 124 and on the server 128) and managing their downloads to the individual video subsystems 102 in conjunction with each local Splash Player. Splash is also responsible for allowing for all of the input regarding billing (as described hereinabove) and for calculations regarding billing. Such instructions can be input manually using an input device or can be input from a computer or processor (e.g. according to instructions stored on memory). Finally, Splash is also responsible for accepting rules and conditions regarding the advertisement and its billing (as described herein) and implementing them throughout the system.

For example, assuming that an advertiser has specified that their preferred demographic for a particular advertisement is adult females and that they only want to spend $200 per day on the advertisement for the shopping mall in question. Also assume that the advertiser is being billed 0.10 cents per person who looked at the advertisement. This information is inputted into Splash, which will dynamically monitor the information being entered into the database 124 by the video subsystems 102. Specifically Splash will monitor the demographic information and will cause the advertisement to be preferentially played on the video display 118 that is then being viewed by the most of number of persons of the target demographic. Splash will also calculate and monitor the total cost of the advertisement per day and per campaign to make sure that when the budgets are reached the advertisement ceases to be shown. In addition Splash can output any desired information regarding the advertising campaign and its costs both on the billing/control computer 138 and on any other computer connected to the network such as laptop 132. It should be understood that Splash itself is not required; any commercial or custom written software accomplishing similar functions will suffice.

Figure 3:
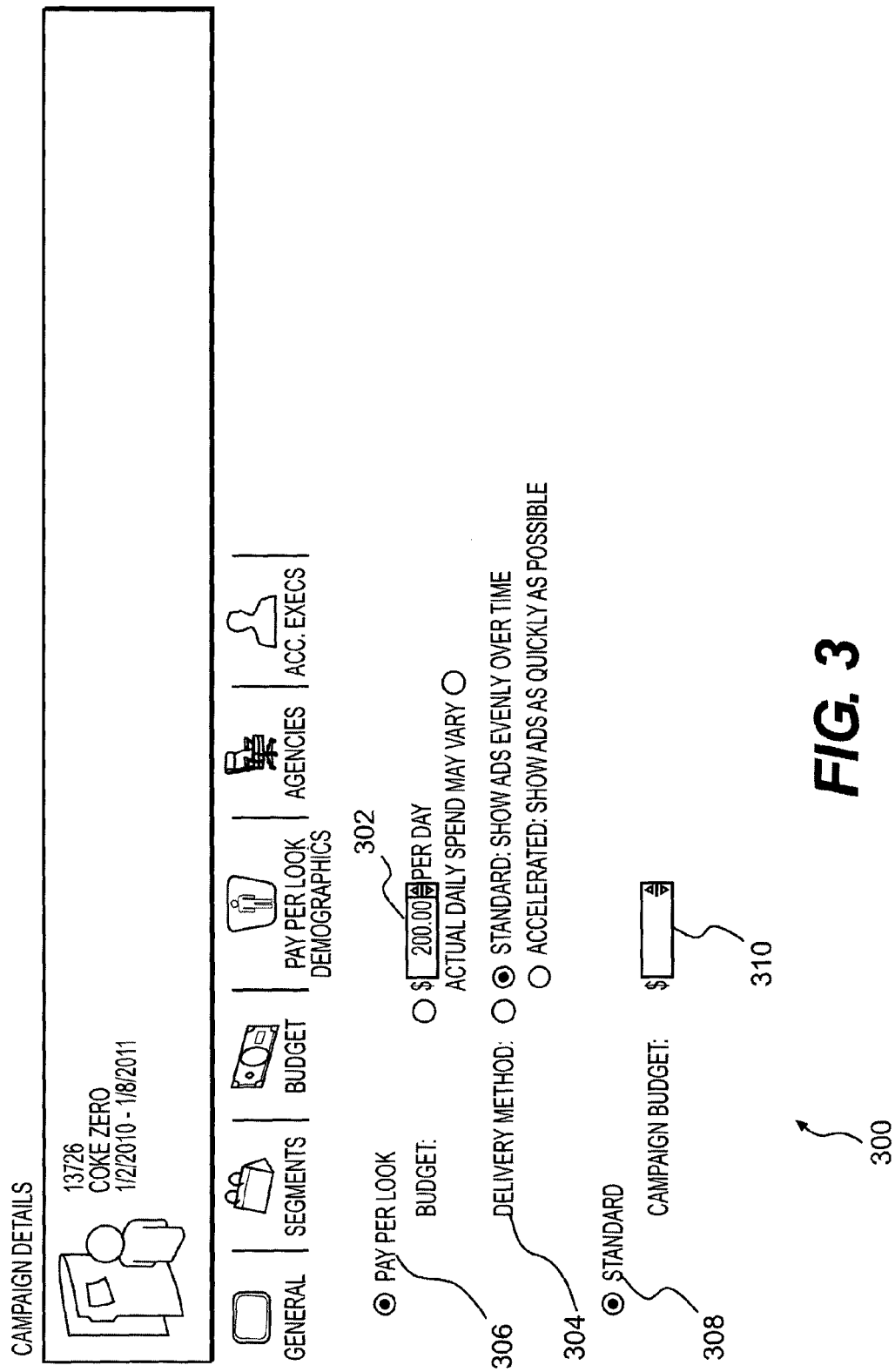
FIG. 3 is a sample data entry screen in respect of a computer system of the present invention.

Samples screen shoots of Splash are shown in FIGS. 3-6. In FIG. 3, there is shown a screen 300 displayed on a display device that will allow for the entry of data respecting daily and campaign budgets for an advertising campaign. For example, using an input device (e.g. a mouse or other point and click device), a selection can be made of either a Pay Per Look 306 budget or a Standard campaign 308 budget. If the Pay Per Look 306 budget option is selected, the budget amount per day can be entered into the form or text window 200 either by inputting the number (e.g. through a keyboard) or by using a point and click device or touchscreen and scrolling through numbers until the desired budge is reached. Further, the delivery method 304 can be selected as either Standard (shows ads evenly over time) or Accelerated (shows ads as quickly as possible).

Figure 4:
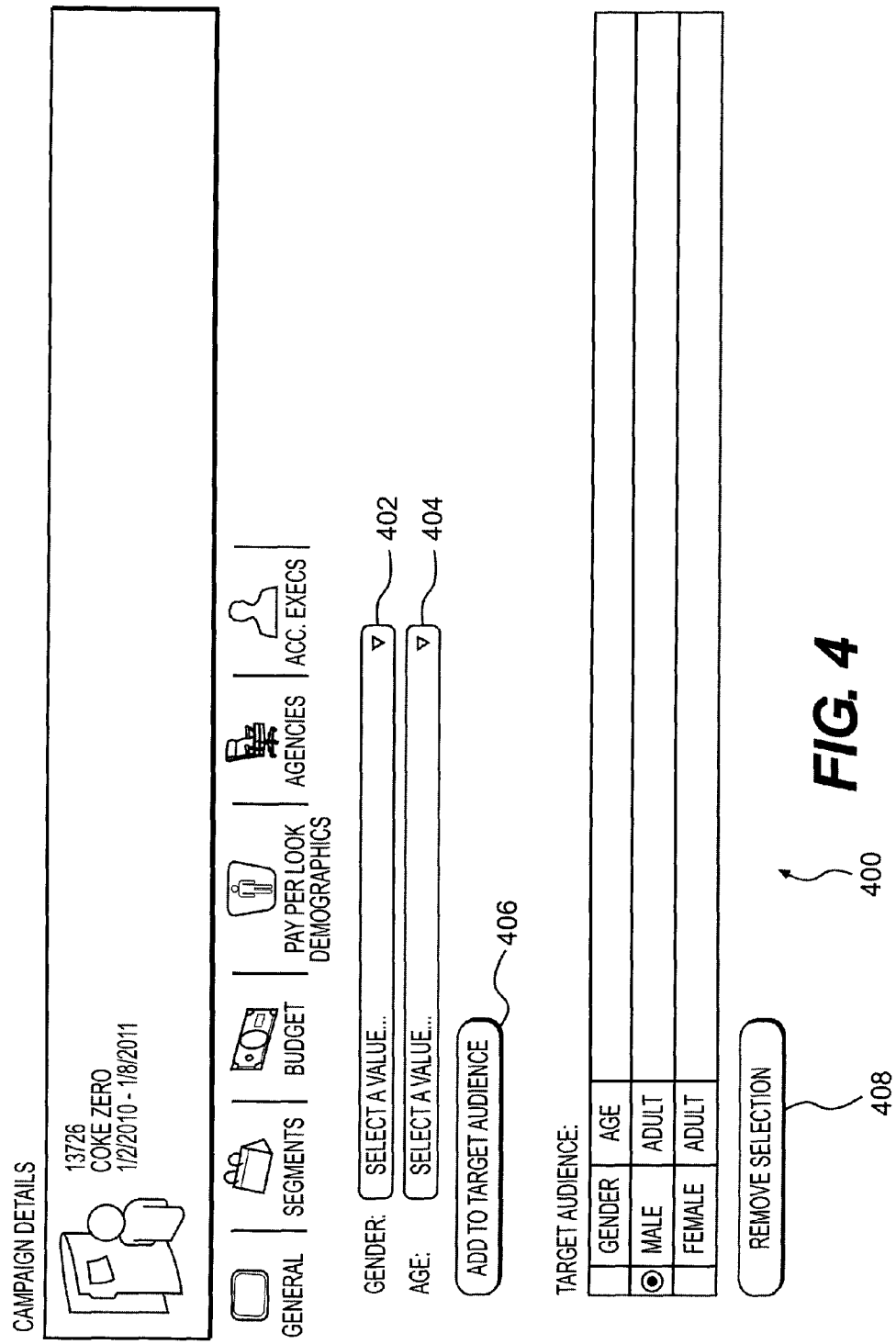
FIG. 4 is a second sample data entry screen in respect of a computer system of the present invention.

In FIG. 4, there is shown a screen 400 that will allow for the entry of data respecting target demographics for a campaign. For example, using an input device the gender and age of target audience members can be selected using the Gender drop down window 402 and the Age drop down window 404 respectively. The age values can be specific numerical values, age ranges or general categories (e.g. adult, youth, etc.). After the target audience gender and age values are entered, a new target audience member with those values can be added to the campaign by selecting the "Add To Target Audience" virtual button 406. Similarly, when new target audience values can be removed from the campaign by selecting the "Remove Selection" virtual buttons. When new or additional target audience values (e.g. gender and age) are selected the values can be stored in the database 124. It is recognized that additional target audience values can be used and incorporated into the system 100 in a similar fashion.

Figure 5:
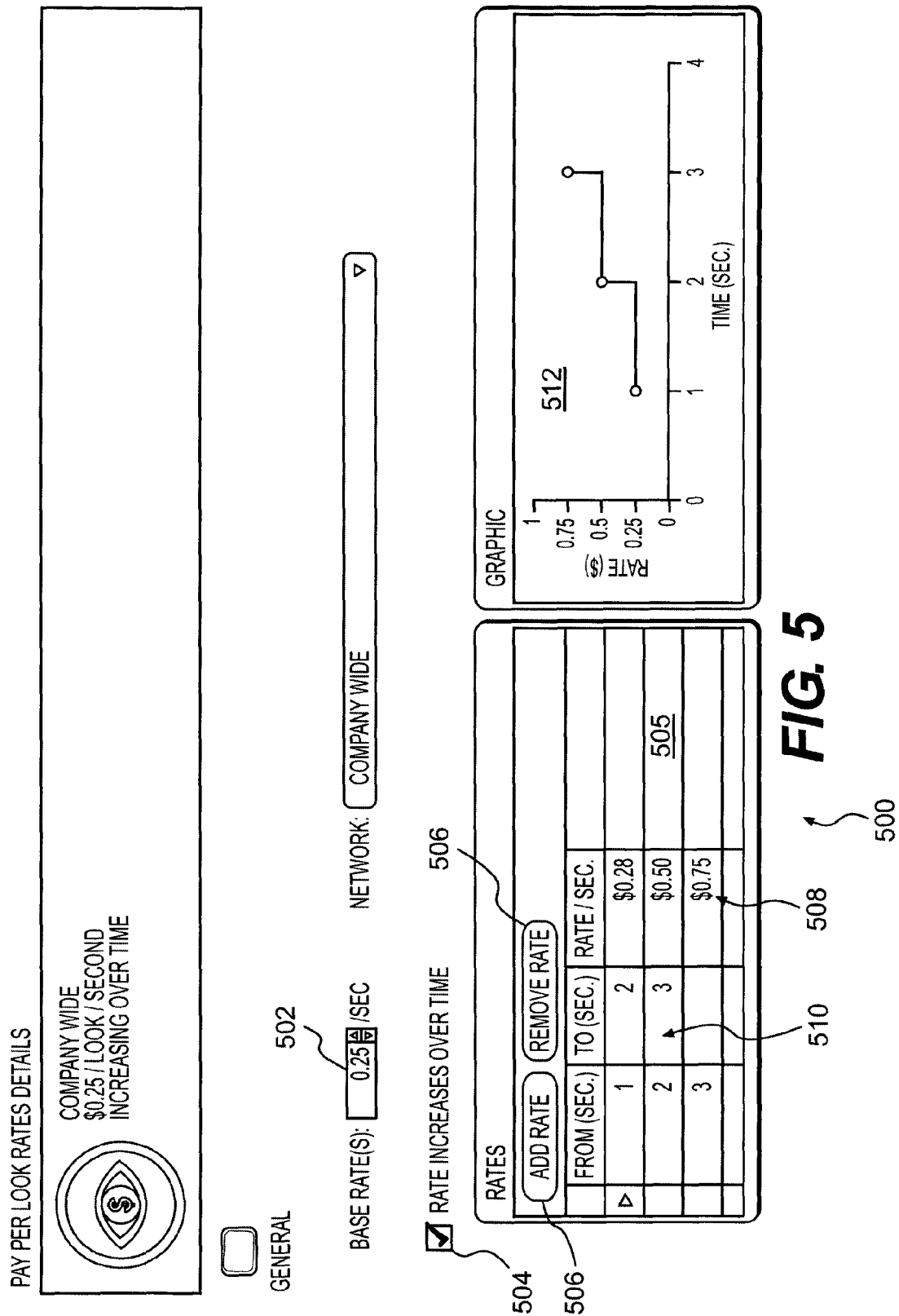
FIG. 5 is a third sample data entry screen in respect of a computer system of the present invention.

In FIG. 5, there is shown a screen 500 that will allow for entry regarding price per person who looked at the advertisement for the campaign. Using this screen the base rate for the price per person who looked at an advertisement can be selected using the base rate text box 502 (either by manually entering the base rate value or by scrolling through values with a point and click device or touchscreen). The rate can also be set to increase over time by selecting a checkbox 504. When the checkbox 504 is selected the rates can be set in the rates frame 505 by using the Add Rate virtual button 506 to add a new rate or the Remove Rate virtual button 506 to remove a rate. More specifically, the rates frame 505 shows three columns with adjustable values. One column 508 includes the rate/second in monetary values and the remaining two columns 510 show the start time and end time for the rate/second value. Using these adjustable values, and by adding and removing rates, the price per person can be budgeted as being dependent on or varying with time. A corresponding graph is shown in the graphic frame 512 that is a visual depiction of the relationship between the rate and the time from the rates frame 505.

Each of these screens 300, 400, 500 are displayed on the display device and the data can be entered manually using an input device or automatically through instructions from a processor communicating over the network.

Figure 6:
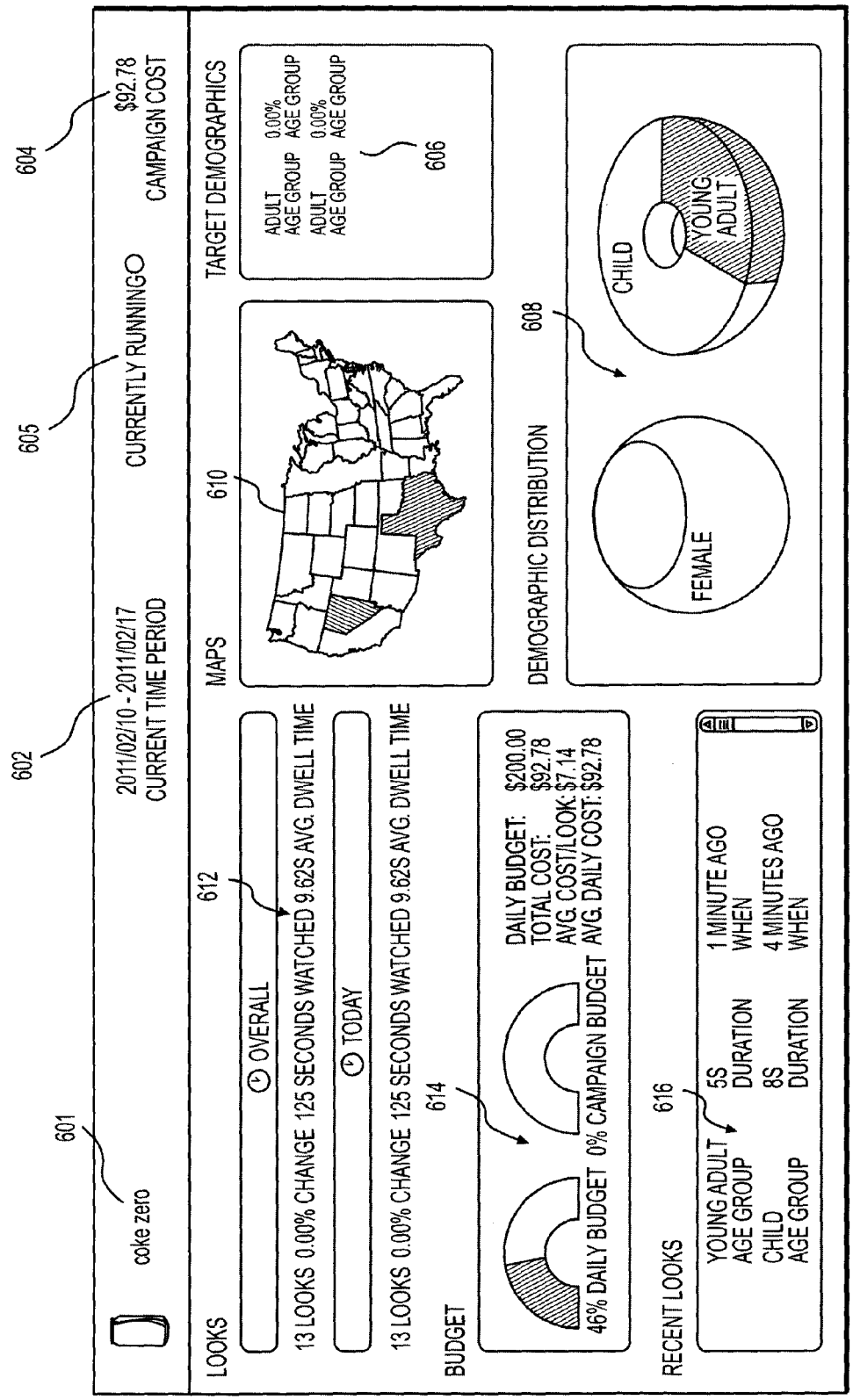
FIG. 6 is a sample data output screen in respect of a computer system of the present invention.

The information and data entered through the screens (or GUIs) represents an advertisement campaign. Advertisement campaigns can be stored in the database 124 for viewing or editing. Multiple advertisement campaigns can be stored in the database 124. The advertising campaigns can be viewed on a display device. For example, FIG. 6 shows a sample campaign data output screen 600 that is displayed on the display device. With reference to the embodiment shown in the campaign data output screen 600, the campaign name 601 (in this case Coke Zero™) is displayed in the upper left corner of the screen 600; the campaign time period 602 is displayed at the top of the screen 600; and the total campaign cost 604 and current cost 605 are shown at the top right of the screen 600. Various data regarding the target audience is shown, including the target demographics group, 606, a map 610, and a graph of the demographic distribution 608. Metrics showing the number on duration of advertising views 612 is shown on the screen 600 including the number of looks, the total number of seconds watched, the average number of seconds watched (e.g. dwell time) and the percentage change in each of such values for each day. Visual information relating to the budget is also shown 614 on the screen 600, including dynamic charts and percentage values showing the daily and overall campaign budget use, as well as information regarding the daily budget, the total cost, the average cost per look and the average daily cost. Finally, recent activity 616 (e.g. recent looks) are also shown dynamically on the screen 600. This recent activity 616 includes the profile of a recent viewer (e.g. showing the gender and age group) the duration and the time period. The information shown on the screen 600 is stored on and retrieved from the database 124 for display on the display device.

The display device is used to visually present an application's graphical user interface (GUI) to a user. The user can manipulate application data by modifying information on the GUI using an input device such as the keyboard for example. Depending on the type of computer 116, 120, the user may have access to other types of input devices, such as, for example, a scroll wheel, trackball, light pen or touch sensitive screen.

Figure 7:
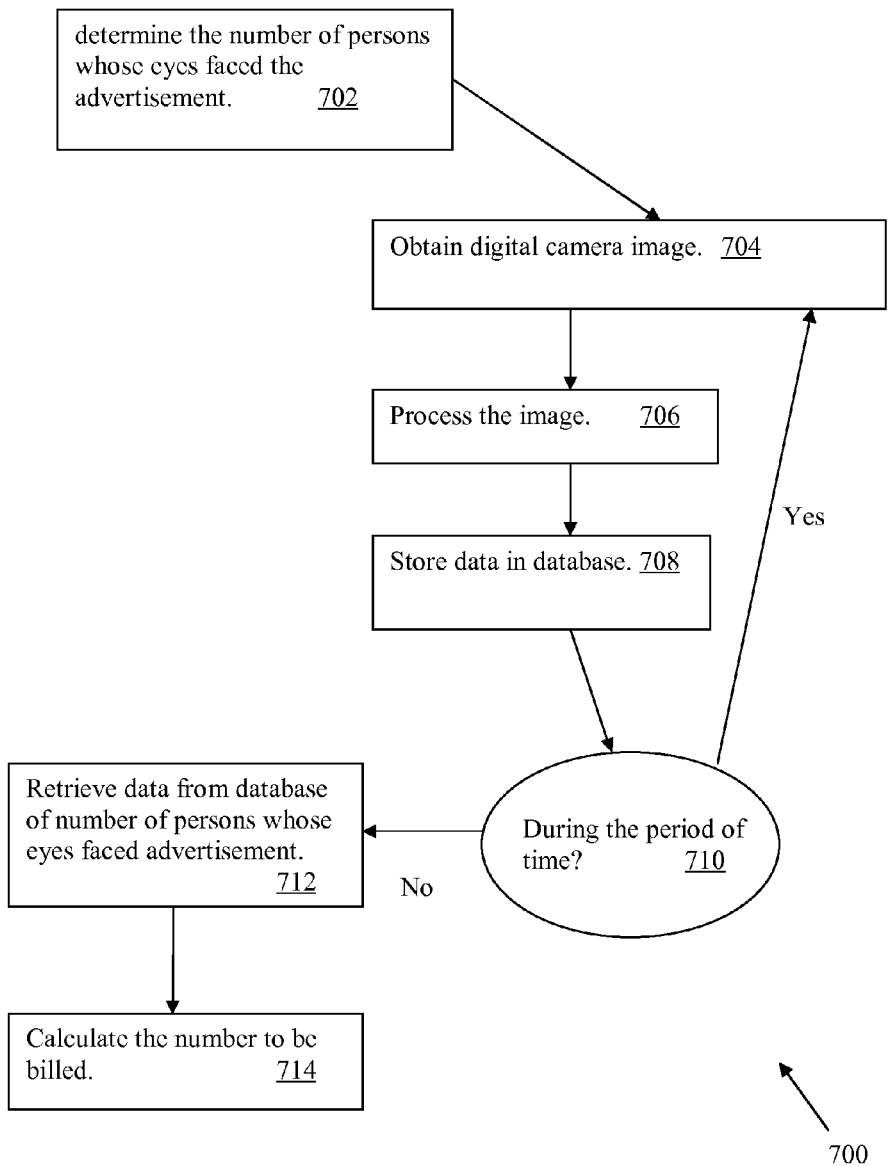
FIG. 7 is a flow chart depicting a method of calculating an amount to be billed in respect of running an out-of-home advertisement during a period of time.

Shown at FIG. 7 is a flow chart of a method 700 of calculating an amount to be billed in respect of running an out-of-home advertisement during a period of time. At step 702 the total number of persons whose eyes faced the advertisement during the period of time are determined by a submethod. The submethod comprises steps 704 to 710. At step 704 an image of a sufficient amount of a person in proximity to the advertisement is obtained to determine whether the person's eyes are facing the advertisement. At step 706, the image is processed by a computer processor to determine whether the person's eyes are facing the advertisement. At step 708, if the person's eyes are facing the advertisement, data indicating that the person's eyes are facing the advertisement is stored in the database. At step 710 a determination is made as to whether it is during the period of time. If so, then steps 704 through 710 are repeated. If not, then step 712 is carried out. At step 712, data representative of the total number of persons whose eyes faced the advertisement during the period is retrieved from the database. Finally, at step 714, a total amount to be billed in respect of the advertisement for the period of time as a function of the total number of persons whose eyes faced the advertisement during the period is calculated via the computer processor.

Figure 8:
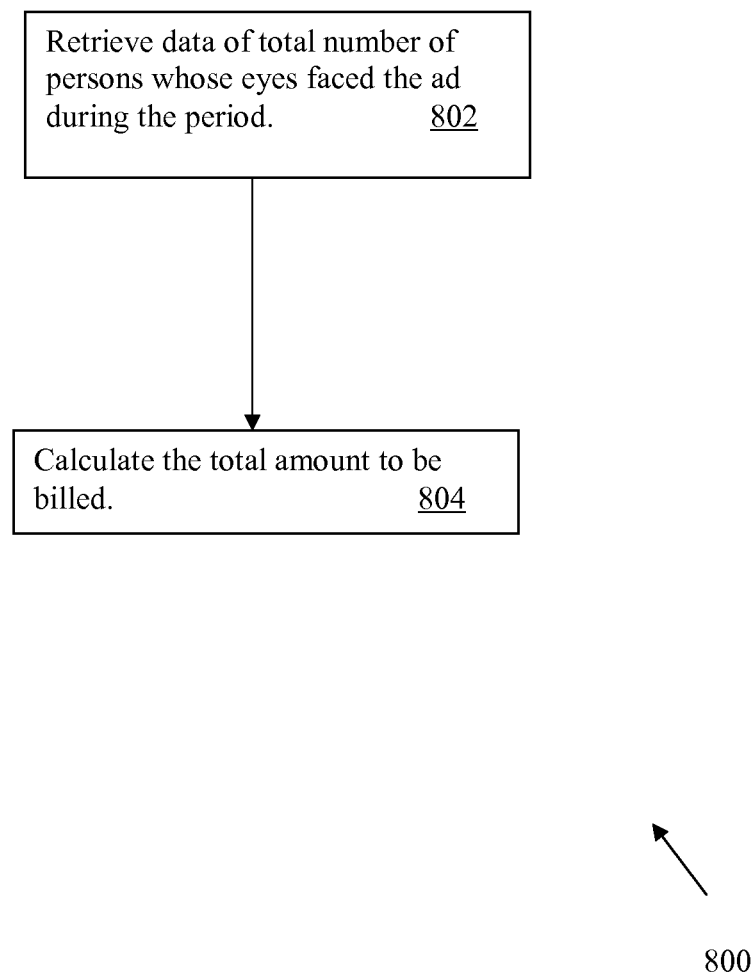
FIG. 8 is a flow chart depicting another method of calculating an amount to be billed in respect of running an out-of-home advertisement during a period of time.

Shown at FIG. 8 is a flow chart of a method 800 of calculating an amount to be billed in respect of running an out-of-home advertisement during a period of time. At step 802 data representative of a total number of persons whose eyes faced the advertisement during the period is retrieved from a database, the data having resulting from computer processing by a first computer processor of images of persons in proximity to the advertisement during the period to determine whether the eyes of the persons were facing the advertisement. At step 804 a total amount to be billed in respect of the advertisement for the period of time is calculated via a second computer processor as a function of the total number of persons whose eyes faced the advertisement during the period.

Figure 9:
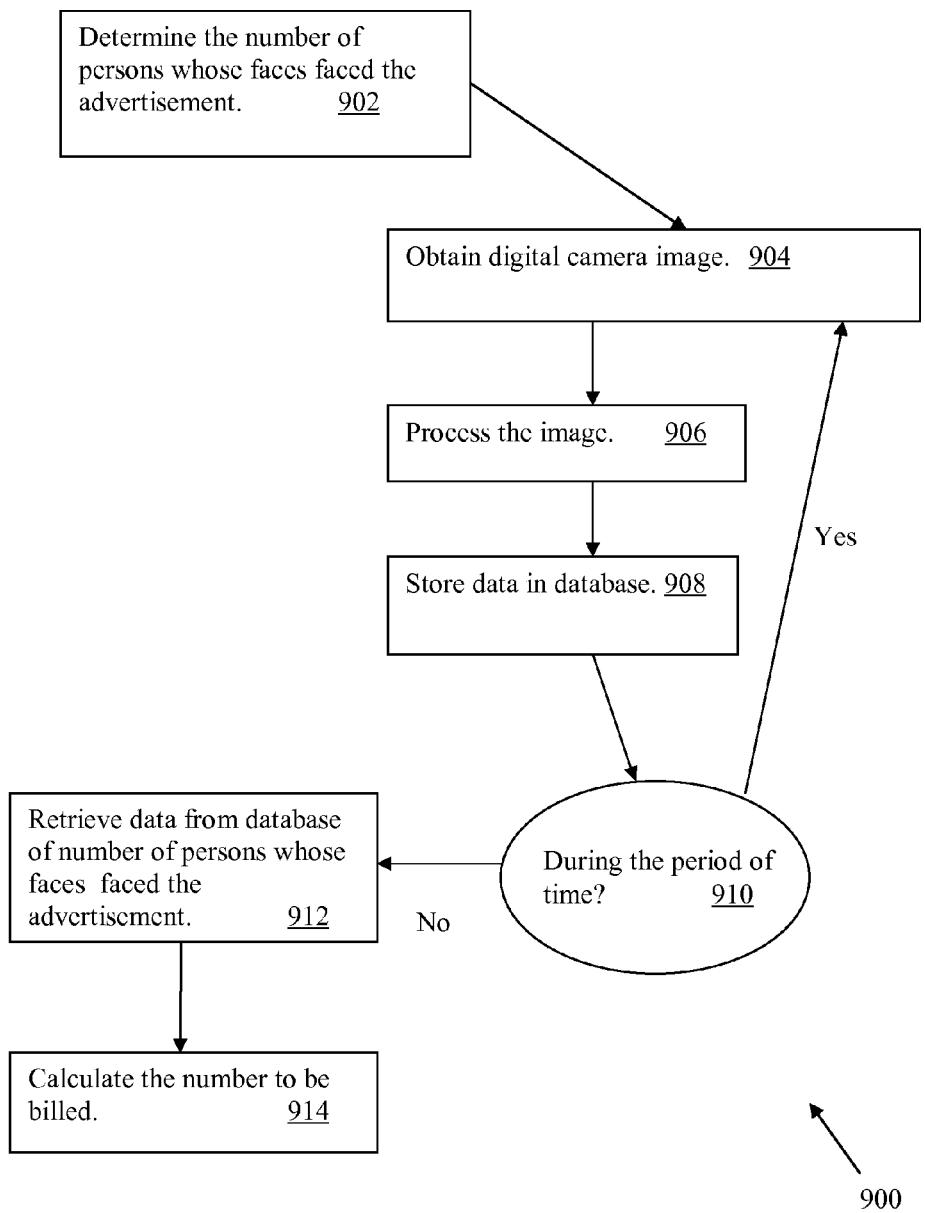
FIG. 9 is a flow chart depicting another method of calculating an amount to be billed in respect of running an out-of-home advertisement during a period of time.

Shown at FIG. 9 is a flow chart of a method 900 of calculating an amount to be billed in respect of running an out-of-home advertisement during a period of time. At step 902 the total number of persons whose faces faced an out-of-home advertisement during the period of time are determined by a submethod. The submethod comprises steps 904 to 910. At step 904 an image of a sufficient amount of a person in proximity to the advertisement is obtained to determine whether the person's face is facing the advertisement. At step 906, the image is processed by a computer processor to determine whether the person's face is facing the advertisement. At step 908, if the person's face is facing the advertisement, data indicating that the person's face is facing the advertisement is stored in the database. At step 910 a determination is made as to whether it is during the period of time. If so, then steps 904 through 910 are repeated. If not, then step 912 is carried out. At step 912, data representative of the total number of persons whose faces faced the advertisement during the period is retrieved from the database. Finally, at step 914, a total amount to be billed in respect of the advertisement for the period of time as a function of the total number of persons whose faces faced the advertisement during the period is calculated via the computer processor.

Figure 10:
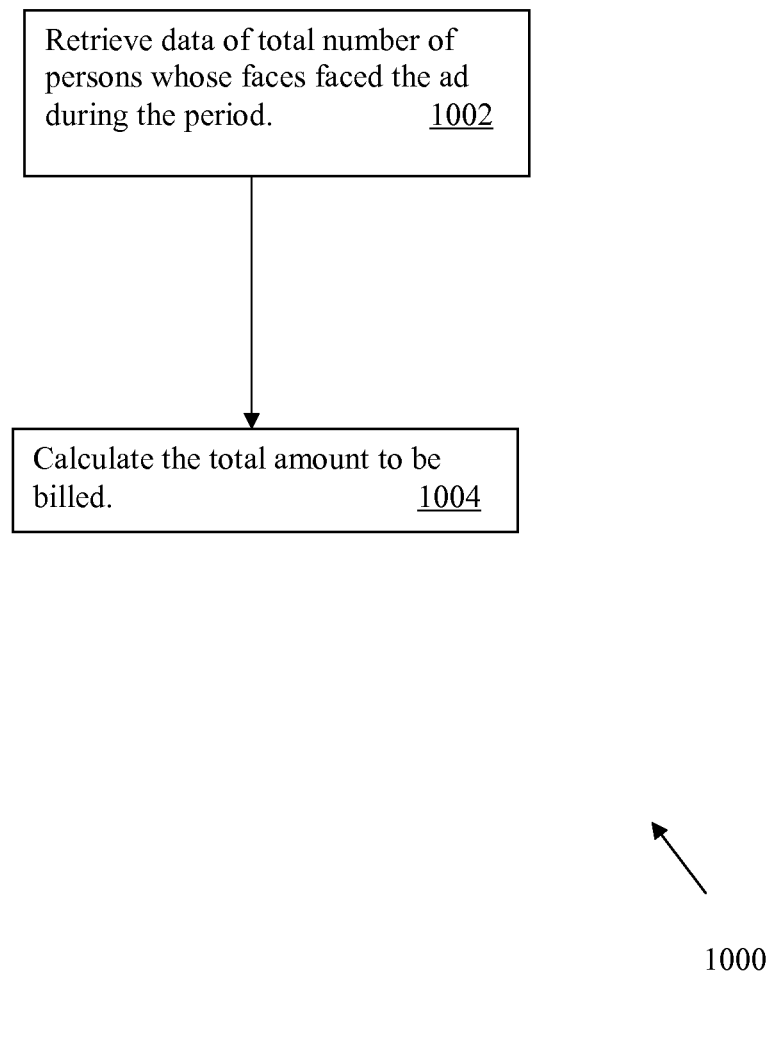
FIG. 10 is a flow chart depicting another method of calculating an amount to be billed in respect of running an out-of-home advertisement during a period of time.

Shown at FIG. 10 is a method 1000 of calculating an amount to be billed in respect of running an out-of-home advertisement during a period of time. At step 1002 data representative of a total number of persons whose faces faced the advertisement during the period retrieved from a database, the data having resulting from computer processing by a first computer processor of images of persons in proximity to the advertisement during the period to determine whether the faces of the persons were facing the advertisement. At step 1004 a total amount to be billed in respect of the advertisement for the period of time is calculated via the computer processor as a function of the total number of persons whose faces faced the advertisement during the period.

Modifications and improvements to the above-described embodiments of the present invention may become apparent to those skilled in the art. The foregoing description is intended to be exemplary rather than limiting. The scope of the present invention is therefore intended to be limited solely by the scope of the appended claims.

The invention claimed is:

1. A method of calculating an amount to be billed in respect of running an out-of-home advertisement during a period of time, comprising:
   a) determining a total number of persons whose eyes and/or face faced the advertisement during the period of time by a sub-method including:
      i) obtaining via a digital camera an image of a sufficient amount of a person in proximity to the advertisement to allow a determination of whether the person's eyes and/or face are facing the advertisement;
      ii) processing the image by a computer processor to determine whether the person's eyes and/or face are facing the advertisement;
      iii) if the person's eyes and/or face are facing the advertisement, storing in a database data indicating that the person's eyes and/or face are facing the advertisement; and
      iv) repeating i) through iii) during the period of time;
   b) retrieving from the database data representative of the total number of persons whose eyes and/or faces faced the advertisement during the period of time;
   c) processing, by the computer processor, each of the images obtained in step a)
      i) to determine a demographic of each person whose eyes and/or face faced the advertisement during the period of time; and
   d) calculating via the computer processor a total amount to be billed in respect of the advertisement for the period of time wherein calculating comprises:
      v) at least for each demographic for which a total number of persons of that demographic whose eyes and/or face faced the advertisement during the period of time is greater than zero, multiplying the number of persons of that demographic whose eyes and/or face faced the advertisement during the period of time by an amount per person in respect of the demographic to obtain a resultant total amount for that demographic; and summing the resultant amounts for each demographic;
      vi) at least for a plurality of groups of times of the day for which a total number of persons whose eyes and/or face faced the advertisement during each one of the plurality of groups of times of the day is greater than zero, multiplying the total number of persons whose eyes and/or face faced the advertisement during a particular one of the groups of times of the day, by an amount per person in respect of that particular one of the groups of times of the day, to obtain a resultant amount for each one of the plurality of groups of times of the day; and summing the resultant amounts for each one of the plurality of groups of times;
      vii) at least for a plurality of groups of dates for which a total number of persons whose eyes and/or face faced the advertisement during each one of the plurality of groups of dates is greater than zero, multiplying the total number of persons whose eyes and/or face faced the advertisement during a particular one of the groups of dates, by an amount per person in respect of that particular one of the groups of dates, to obtain a resultant amount for each one of the plurality of the groups of dates; and summing the resultant amounts for each one of the plurality of the groups of dates;

viii) at least for a plurality of locations for which a total number of persons whose eyes and/or face faced the advertisement at each one of the plurality of locations is greater than zero, multiplying the total number of persons whose eyes and/or face faced the advertisement at a particular location of the plurality of locations, by an amount per person in respect of that particular location, to obtain a resultant amount for each one of the plurality of locations; and summing the resultant amounts for each of the plurality of locations;

ix) at least for a plurality of groups of durations of time that a person's eyes and/or face faced the advertisement for which a total number of persons whose eyes and/or face faced the advertisement during each one of the plurality of the groups of durations of time is greater than zero, multiplying the total number of persons whose eyes and/or face faced the advertisement during a particular one of the groups of durations of time, by an amount per person in respect of that particular one of the groups of durations of time, to obtain a resultant amount for each one of the plurality of groups of durations of time; and summing the resultant amounts for each one of the plurality of the groups of durations of time; or x) any combination of two or more of v) to ix).

2. The method of claim 1, wherein obtaining the image includes obtaining an image of a face of the person.

3. The method of claim 1, further comprising, prior to obtaining the image via the digital camera, positioning the digital camera with respect to the advertisement so as to be able to obtain the image.

4. The method of claim 3, wherein the camera is positioned so as to be facing in the same general direction as the advertisement.

5. The method of claim 1, wherein the demographic comprises an age group of the person or a sex of the person.

6. The method of claim 1, wherein processing the image comprises processing the image via facial recognition software.

7. The method of claim 1, further comprising storing in the database data indicating one or more of a time of day, date, or location that the image was obtained.

8. The method of claim 1, wherein the data indicating the location where the image is obtained is obtained via a positioning system.

9. The method of claim 1, further comprising storing in the database data indicating a duration of time that the person's eyes and/or face are facing the advertisement.

10. The method of claim 1, further comprising, if the person's eyes and/or face are not facing the advertisement, storing in the database data indicating that the person's eyes and/or face are not facing the advertisement.

11. The method of claim 1, wherein the amount per person to be billed differs: in respect of at least two demographics; in respect of at least two of the groups of times of the day; in respect of at least two of the groups of dates; in respect of at least two locations; and/or in respect of at least two groups of durations.

12. The method of claim 1, wherein the advertisement is presented via a digital medium.

13. The method of claim 12, wherein the advertisement is one of a plurality of advertisements being presented via the digital medium during the period of time.

14. The method of claim 1, further comprising changing at least one of the times of the day, dates, and frequency of presentation of the advertisement during the period of time, based on the demographics of the persons whose eyes and/or faces faced the advertisement during at least a portion of the period of time.

15. The method of claim 1, wherein the period of time is divided into a plurality of sub-periods of time, the method further comprising at least periodically recalculating a total amount to be billed in respect of the advertisement for one of the sub-periods of time, and when the total amount to be billed in respect of the advertisement for that one of the sub-periods of time reaches a budgeted amount for that one of the sub-periods of time, reducing a frequency of or stopping presentation of the advertisement for a remainder of that one of the sub-periods of time.

16. The method of claim 1, further comprising at least periodically recalculating the total amount to be billed in respect of the advertisement to date, and when the total amount to be billed in respect of the advertisement to date reaches a budgeted amount for that advertisement, stopping presentation of the advertisement.

17. The method of claim 12, wherein the digital medium is one of a plurality of associated digital media, and the method further comprises changing, based on demographics of the persons whose eyes and/or faces faced the advertisement during at least a portion of the period of time, at least one of times of the day, dates, and frequency of presentation of the advertisement on the associated digital media on which the advertisement is presented.

18. A system for calculating an amount to be billed in respect of running an out-of-home advertisement during a period of time, comprising:

a) a digital image obtention component that obtains from a digital camera an image of a sufficient amount of a person in proximity to the advertisement to determine whether the person's eyes and/or face are facing the advertisement or the person's face is facing the advertisement;

b) a digital image processing component, including at least one computer processor, that processes the image for determining whether the person's eyes and/or face faced the advertisement and to allow a determination of the demographic of the person; and c) a database for storing a data indicating that the person's eyes and/or face faced the advertisement, if the person's eyes and/or face are facing the advertisement or the person's face is facing the advertisement;

d) a retrieval component that retrieves from the database data representative of the total number of persons whose eyes and/or faces are facing the advertisement during the period of time; and e) a calculator component that calculates a total amount to be billed in respect of the advertisement for the period of time by a method comprising:

i) at least for each demographic for which a total number of persons of that demographic whose eyes and/or faces faced the advertisement during the period of time is greater than zero, multiplying the number of persons of that demographic whose eyes and/or faces faced the advertisement during the period of time by an amount per person in respect of the demographic to obtain a resultant total amount for that demographic; and summing the resultant amounts for each demographic;

ii) at least for a plurality of groups of times of the day for which a total number of persons whose eyes and/or faces faced the advertisement during each one of the plurality of groups of times of the day is greater than zero, multiplying the total number of persons whose eyes and/or faces faced the advertisement during a particular one of the groups of times of the day, by an amount per person in respect of that particular one of the groups of times of the day, to obtain a resultant amount for each one of the plurality of groups of times of the day; and summing the resultant amounts for each one of the plurality of groups of times;

iii) at least for a plurality of groups of dates for which a total number of persons whose eyes and/or faces faced the advertisement during each one of the plurality of the groups of dates is greater than zero, multiplying the total number of persons whose eyes and/or faces faced the advertisement during a particular one of the groups of dates, by an amount per person in respect of that particular one of the groups of dates, to obtain a resultant amount for each one of the plurality of the groups of dates; and summing the resultant amounts for each one of the plurality of the groups of dates;

iv) at least for a plurality of locations for which a total number of persons whose eyes and/or faces faced the advertisement at each one of the plurality of locations is greater than zero, multiplying the total number of persons whose eyes and/or faces faced the advertisement at a particular location of the plurality of locations, by an amount per person in respect of that particular location, to obtain a resultant amount for each one of the plurality of locations; and summing the resultant amounts for each of the plurality of locations;

v) at least for a plurality of groups of durations of time that a person's eyes and/or face faced the advertisement for which a total number of persons whose eyes and/or faces faced the advertisement during each one of the plurality of the groups of durations of time is greater than zero, multiplying the total number of persons whose eyes and/or faces faced the advertisement during a particular one of the groups of durations of time, by an amount per person in respect of that particular one of the groups of durations of time, to obtain a resultant amount for each one of the plurality of groups of durations of time; and summing the resultant amounts for each one of the plurality of the groups of durations of time; or vi) any combination of two or more of i) to v).

19. The system of claim 18, wherein the digital image obtention component obtains from the digital camera an image of a face of the person.

20. The system of claim 18, wherein the demographic comprises an age group of the person or a sex of the person.

21. The system of claim 18, wherein the digital image processing component includes facial recognition software.

22. The system of claim 18, wherein data indicating one or more of a time of day, date or location that the image was obtained is stored in the database and/or the duration of time that the person's eyes and/or face were facing the advertisement.

23. The system of claim 22, wherein the data indicating the location where the image was obtained is obtained via a positioning system, and wherein data indicating a duration of time that the person's eyes and/or face are facing the advertisement is stored in the database.

24. The system of claim 18, wherein the amount per person billed differs in respect of at least two demographics, in respect of at least two of the groups of times of the day, in respect of at least two of the groups of dates, in respect of at least two locations, or in respect of at least two groups of durations.

25. The system of claim 18, further comprising a digital medium via which the advertisement is presented.

26. The system of claim 25, wherein the advertisement is one of a plurality of advertisements being presented via the digital medium during the period of time.

27. The system of claim 18, further comprising an advertising control component that changes at least one of times of the day, dates, and frequency of presentation of the advertisement during the period of time based on the demographic of the person whose eyes and/or faces faced the advertisement during at least a portion of the period of time.

28. The system of claim 18, wherein the period of time is divided into a plurality of sub-periods of time; further comprising a financial control component that at least periodically recalculates a total amount to be billed in respect of the advertisement for at least one of the sub-periods of time, and when the total amount to be billed in respect of the advertisement for that one of the sub-periods of time reaches a budgeted amount for that one of the sub-periods of time, reduces a frequency of, or stops, presentation of the advertisement for a remainder of that one of the sub-periods of time.

29. The system of claim 28, wherein, when the presentation of the advertisement is stopped, the financial control component restarts presentation of the advertisement in a subsequent one of the sub-periods of time.

30. The system of claim 28, wherein the sub-periods of times are days.

31. The system of claim 18, further comprising a financial control component that at least periodically recalculates the total amount to be billed in respect of the advertisement to date, and when the total amount to be billed in respect of the advertisement to date reaches a budgeted amount for that advertisement, stops presentation of the advertisement.

32. The system of claim 25, wherein the digital medium is one of a plurality of associated digital media; further comprising an advertising control component that changes, based on demographics of the persons whose eyes and/or faces faced the advertisement during at least a portion of the period of time, at least one of times of the day, dates, and frequency of presentation of the advertisement on at least two of the associated digital media and/or at least one of the associated digital media on which the advertisement is presented.

* * * * *